UNITED STATES PATENT OFFICE.

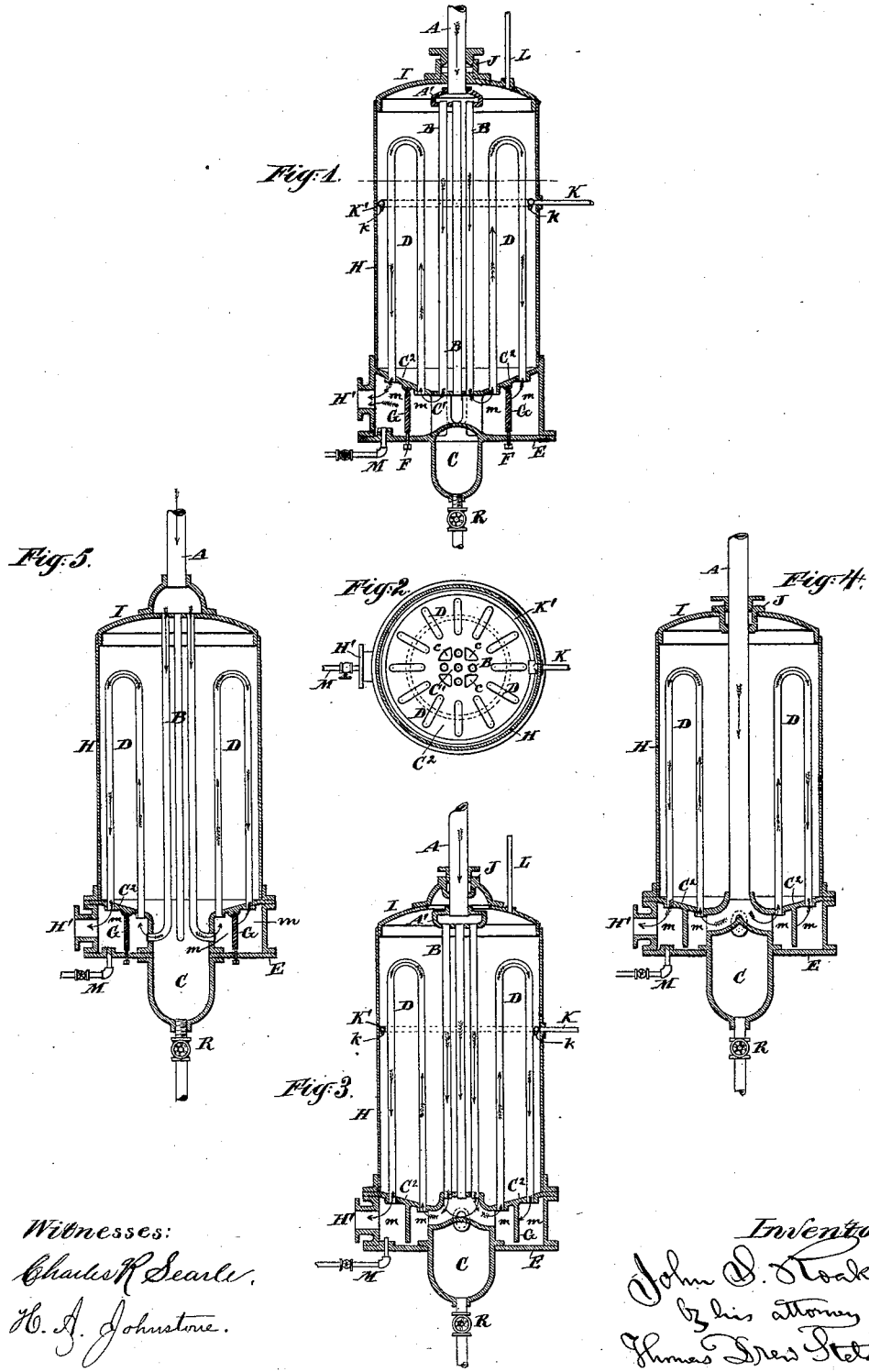

JOHN S. ROAKE, OF NEW YORK, N. Y.

WATER HEATER AND PURIFIER.

SPECIFICATION forming part of Letters Patent No. 428,694, dated May 27, 1890.

Application filed March 10, 1888. Serial No. 266,851. (No model.)

*To all whom it may concern:*

Be it known that I, JOHN S. ROAKE, of the city and county of New York, in the State of New York, have invented a certain new and useful Improvement in Water Heaters and Purifiers, of which the following is a specification.

My heater is of the class which utilizes the heat of exhaust-steam, causing it to traverse through tubes immersed in the water to be heated and purified. The conditions allow the water to be at a much higher pressure than the exhaust-steam.

The invention is intended more especially for heating feed-water for boilers. I will describe it as thus applied; but it may be useful for any purpose where water requires to be heated or purified, or both.

I have devised a novel arrangement of tubes and chambers which expose a great surface to the water to be heated, with provision for gentle circulation and a quiet space in which the impurities may collect by gravity and be blown out at intervals. I introduce the cold feed-water under such conditions that it contributes to promote a constant circulation of the water in the heater. I provide for the different rates of expansion of the parts. I provide for taking away the condensed water.

The accompanying drawings form a part of this specification and represent what I consider the best means of carrying out the invention.

Figure 1 is a vertical section through the entire apparatus, and Fig. 2 is a horizontal section on the line $xx$ in Fig. 1. The remaining Figs. 3, 4, and 5 are central vertical sections showing modifications.

Similar letters of reference indicate corresponding parts in all the figures where they occur.

The exhaust-steam is led through a short vertical pipe A, smoothly finished on its exterior, into a horizontally-extended chamber A', the upper side of which is domed to better resist a strong pressure from without. B are tubes set in the base of A' and screwed or otherwise set in a hollow cross C', which forms the upper interior portion of a cup-shaped vessel C. There are between the branches of this cross spaces $c$, which communicate between the main interior of the heater and the lower portion of this chamber. There is a cock R at the bottom of C. From the upper edge of the vessel C an inverted conical partition $C^2$ extends outward and upward, in which are set U-shaped tubes D, arranged as shown. A horizontal plate E at a lower level carries screws F, inserted from below, adapted to press upward, with their smooth points inserted in corresponding shallow holes in the base of a ring G. The upper edge of this ring engages in a corresponding groove in the under face of $C^2$ and forms an approximately tight joint, so as to prevent the passage of any considerable quantity of the exhaust-steam.

H is a hollow upright cylinder forming the external shell of the heater.

I is a dome-shaped top equipped with a stuffing-box J, which forms a tight joint around the smooth pipe A, with liberty for the parts to move up and down relatively to each other to accommodate the expansion and contraction.

H' is the discharge-nozzle for the exhaust-steam.

K is a pipe bringing the cold water to be purified. It enters through a suitable boss in the casing H. Its interior is equipped with provisions for deflecting the water downward in the form of a pipe K', extending horizontally a portion or the whole of the way around between the inverted-U tubes D and the interior of the shell H, provided with a number of discharge-nozzles $k$, all on the under side.

L is a pipe which takes away the heated and purified water. It is tapped through a boss.

M is a pipe, which is set in the plate E and serves to carry away the water of condensation.

E' is a boss extending upward from the upper face of the plate E at the junction with M. It insures that the water shall be retained to a sufficient depth to immerse the bottom of the ring G. There is a space under this ring which allows the water to flow freely across, but the steam is stopped and compelled to traverse through the pipes D.

In operating, the steam at any pressure, but presumed to be exhaust-steam slightly above that of the atmospheric pressure, enters through A, spreads laterally in the chamber A', and descends through the series of small pipes B into the hollow cross C', from which it is discharged radially through corresponding apertures in the cup C into the annular chamber $m$. The upper portion of the latter, which is occupied by steam, is divided by the ring G into two annular chambers, one concentric to the other. The steam received from the center into the innermost portion of this annular chamber $m$ rises through the first half of each of the series of U-shaped pipes D and descends through the second half of each into the annular chamber $m$, exterior to the ring G, from which it escapes freely through the nozzle H'. The feed-pump or other supplying means forces in the water through the pipe K, and it is discharged through the pipe L. The superior gravity of the cold water thus received in the heater induces a tendency to descend. This is increased by the momentum with which it is received, being projected downward actively from the orifices $k$. The pipes B near the center of the heater are filled with freshly-received steam. There is a tendency of the water in the heater to rise in the center and to descend near the exterior. There is an active circulation of the water in the upper and main portion of the apparatus. At each traverse inward of the water at the bottom it passes over the passages $c$, and any solid matter in the water is allowed to descend into the interior of the pocket C below the cross, where it is quiet. The mud accumulates in this pocket and is discharged at intervals by opening the cock R for a sufficient period. The water resulting from the condensation of the steam in the pipes B is separated from the steam before it rises to pass through the pipes D, and the water resulting from condensation in both branches of the latter accumulates until it is at a sufficient height to escape through the pipe M, through which it flows away. The water flows freely across under the ring G. In putting the parts together the screws F are relaxed and the ring allowed to sink a little. After the other parts have been firmly bolted together these screws F are turned to drive the ring G up to a properly-fitted bearing on the under face of C', so as to make a tolerably tight joint at its upper edge.

Modifications may be made without departing from the principle or sacrificing the advantages of the invention. I can increase or diminish the number of the tubes B and D. The horizontal pipe K' may be shortened and the number of nozzles $k$ reduced. A good portion of the effect may be obtained by dispensing with the pipe K and discharging all the water through one nozzle $k$; but it is essential to my invention that it be discharged downward near the periphery.

Parts of the invention may be used without the whole.

Fig. 3 shows a modification, in which the detachable ring G, with its adjusting means, is replaced by a partial corresponding ring cast on the bottom of the flange $C^2$. Some other changes—such as making the plate E separate from the body and uniting it with flanges and bolts—will be obvious from the figure.

In the form shown in Fig. 4 the chamber A' and tubes B are replaced by a single tube, which is a continuation of the tube A.

In the form shown in Fig. 5 the chamber A' is replaced by a chamber which is fast to and forms a part of the top, and the tubes B are replaced by bent tubes. In this the expansion and contraction are accommodated by the yielding of the bent tubes in the obvious manner.

I claim as my invention—

1. In a water heater and purifier, the main cylinder or casing H, stuffing-box J, smooth pipe A, chamber A', and connected pipes B, in combination with each other, and with the hollow cross C', mud-chamber C, and exterior steam and water chamber $m$, communicating with the escape-nozzle H', as herein specified.

2. In a water heater and purifier, the casting H, stuffing-box J, smooth pipe A, chamber A', and pipes B, in combination with each other, and with the central chamber C', mud-chamber C, steam and water chamber $m$, communicating with the escape-nozzle H', the U-shaped pipes D, and provisions for introducing and discharging steam and water, substantially as herein specified.

3. In a water heater and purifier, the adjusting-screws F, in combination with the ring G, and with a series of pipes B, bringing steam and condensed water down the center of the apparatus into the chambers C and $m$, and with the inverted conical partition $C^2$ and inverted-U-shaped pipes D, and with provisions for introducing and discharging steam and water, as herein specified.

4. In a water heater and purifier, in combination with the shell H, annular pipes $k$, receiving water through the pipe K and discharging it gently downward, so as to promote the descent of the water in the periphery of the shell H, and thereby promote the circulation of the water, and with means, as the steam-pipes B D, for presenting a liberal heating-surface thereto, as herein specified.

In testimony whereof I have hereunto set my hand, at New York city, this 3d day of March, 1888, in the presence of two subscribing witnesses.

JOHN S. ROAKE.

Witnesses:
M. F. BOYLE,
H. A. JOHNSTONE.